June 25, 1968 C. L. OWEN ET AL 3,389,915

AUDIO DEVICE

Filed Oct. 18, 1965 4 Sheets-Sheet 1

INVENTORS
CHARLES L. OWEN
FRANK J. SILHAVY
HENRYK W. MERESZ
BY Amster & Rothstein
ATTORNEYS INVENTORS
CHARLES L. OWEN
FRANK J. SILHAVY
BY HENRYK W. MERESZ
Amster & Rothstein
ATTORNEYS June 25, 1968 C. L. OWEN ET AL 3,389,915

AUDIO DEVICE

Filed Oct. 18, 1965 4 Sheets-Sheet 3

INVENTORS
CHARLES L. OWEN
FRANK J. SILHAVY
HENRYK W. MERESZ
BY
Amster & Rothstein
ATTORNEYS

AUDIO DEVICE

Filed Oct. 18, 1965 4 Sheets-Sheet 4

INVENTORS
CHARLES L. OWEN
FRANK J. SILHAVY
BY HENRYK W. MERESZ
Amster & Rothstein
ATTORNEYS 3,389,915

AUDIO DEVICE

Charles L. Owen, Skokie, Frank J. Silhavy, Park Forest, and Henryk W. Meresz, Chicago, Ill., assignors, by mesne assignments, to Ideal Toy Corporation, Hollis, N.Y., a corporation of New York Filed Oct. 18, 1965, Ser. No. 497,279
3 Claims. (Cl. 274—1)

ABSTRACT OF THE DISCLOSURE

An audio device intended primarily for installation in a doll and having a tape with recording grooves thereon, a helical spring which is arranged to actually carry the tape through recording movement past a stylus, and a positioning lever which moves against the stylus to actuate it into a clearance position during intervals between recording operation of the device, the surfaces on the positioning lever and stylus which make surface contact with each other having cooperating serrations thereon which mate with each other to hold the stylus against movement while it is in its clearance position so it can be accurately positioned thereafter in a recording groove.

The present invention relates generally to an audio device for use in dolls, toys and the like, and in particular to a miniature phonograph which is capable of producing any one of a number of different audio sequences.

It has long been known to have a record disc having recorded thereon a plurality of discrete sound sequences all starting at the same starting position contiguous to the outer edge of the record and spiraling towards the center thereof in interleaved fashion. With this type of record, depending upon the rotational orientation of the record disc relative to the stylus when the latter is set down contiguous to the outer edge of the record, one of the plural sound sequences is played back. Of more recent times, a smaller version of this so-called multi-groove disc has been incorporated in a phonograph device for use in various types of toys, including dolls. Such phonograph device, which is likewise old and well known, includes a stylus mounted on a stylus arm arranged to track a sound groove on the record disc. Stylus movement in turn is converted into an audible reproduction of the sound sequence by coupling the stylus to a speaker. The record disc is turned at the required speed, as by the provision of a spring motor, which may be loaded by a drawstring. A governor is provided in such phonograph mechanisms to assure constant speed turning of the record disc to achieve the desired playback of the sound sequence recorded thereon. When such multi-groove record disc is embodied in a drawstring-operated phonograph device, any one of the plurality of discrete sound sequences can be played, either on a random basis or in a particular order. Recently, such devices have also been adapted for drive by a small fractional horsepower motor operated from one or more batteries. However, whether incorporating a manually-actuated spring motor or a battery-operated electric motor, such devices are of such size that they cannot be incorporated into relatively small toys and dolls. There exists a need for phonograph mechanisms which are of a size such that it can be incorporated into relatively small toys including, without limitation, so-called twelve inch fashion dolls. Such phonograph mechanisms should be capable of being manufactured at relatively low unit cost and should be of exceptionally reliable and rugged construction to tolerate repeated use, and to some extent abuse, as is occasioned with many toys.

Broadly, it is an object of the present invention to provide an improved audio device which realizes one or more of the aforesaid objectives. Specifically, it is within the contemplation of the present invention to provide a miniature phonograph which is capable of playing one of a plurality of discrete sound sequences and is suitable for manufacture at a relatively low unit cost.

In accordance with an illustrative embodiment demonstrating objects and features of the present invention there is provided an audio device which comprises sound-reproducing means including a stylus, means supporting said stylus in a sound-reproducing position, a recording tape having plural recording grooves therein, and tape-carrier means for actuating said recording tape through movement past the stylus for establishing tracking engagement of said stylus in one of said recording grooves. More particularly, the tape-carrier means is in the form of a spring such as is commonly used in a spring motor, and is transferred from a storage drum to a winding drum from which it uncoils in returning to an at-rest position on the storage drum. By operatively connecting the tape and spring for movement in unison, the returning movement of the spring is effectively utilized to actuate the recording tape through its required movement past the tracking stylus to produce sound reproduction.

The above brief description as well as further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 7 illustrates the stylus in its playback position in association with said recording tape for playback of the first recorded message on said recorded tape;

FIG. 8 illustrates said stylus also in a playback position but in tracking engagement with a subsequently encountered recording groove on the recording tape and after completion of the playback thereof;

Figure 7:
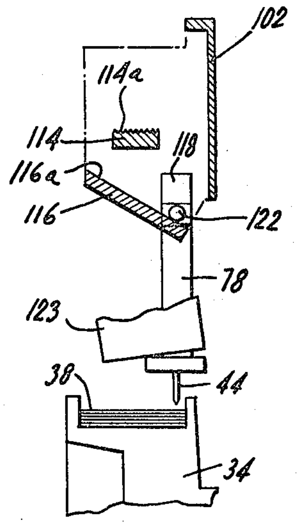
FIGS. 7–10 are diagrammatic views of the typical positions of movement of said stylus during playback of the recorded messages on the recording tape, to wit.
Figure 8:
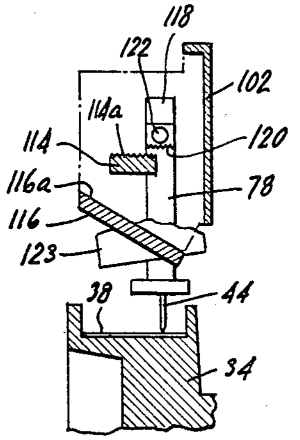
Figure 9:
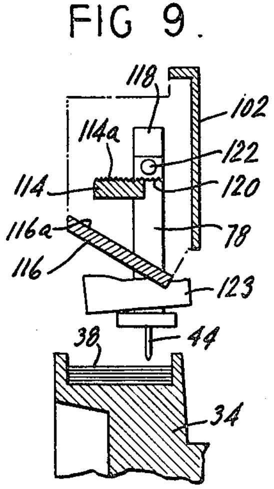
Figure 10:
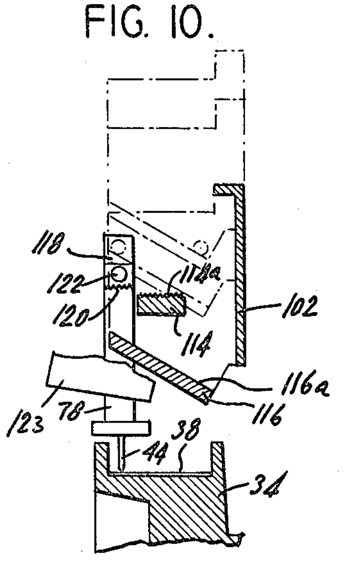

FIG. 9 illustrates the stylus in its clearance position removed from said recording tape during which said recording tape and carrier spring assembly is placed in condition for the next sequential playback of a recording groove on said recording tape; and FIG. 10 illustrates said stylus is tracking engagement with the final recording groove on the recording tape, and illustrates in phantom perspective the positions of movement thereof for returning said stylus to the starting position of FIG. 7.

Figure 1:
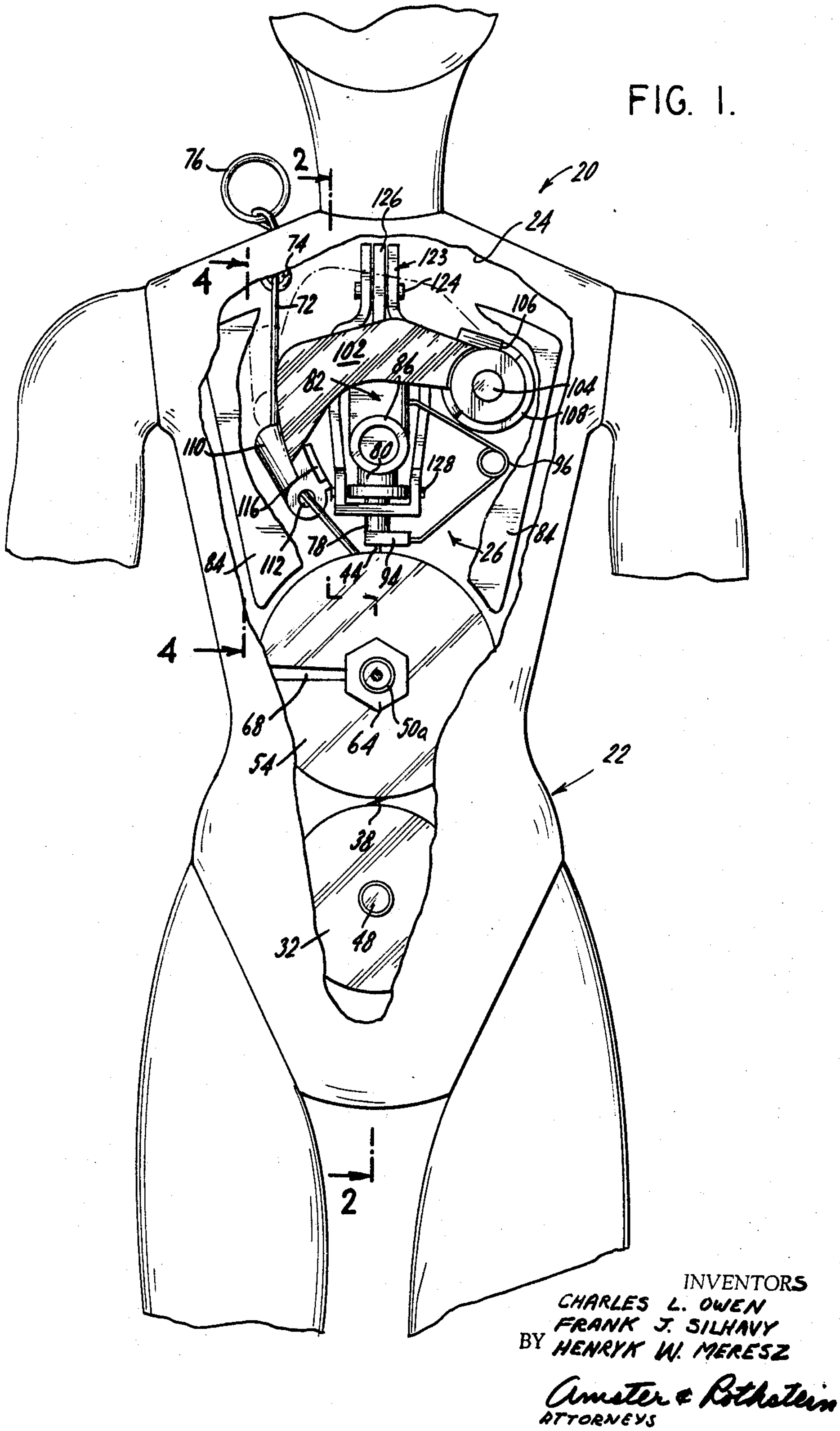
FIG. 1 is a partial front elevational view of a doll with the front body wall thereof broken away to better illustrate an audio device internally mounted thereof which demonstrates features of the present invention.

Reference is now made to the drawings, and in particular to FIG. 1 in which there is shown a doll, generally designated 20, of a currently popular size measuring approximately twelve inches in height and proportioned accordingly. The doll 20 includes a hollow body 22 which thus provides a chamber or enclosure 24 of only modest dimensions. Nonetheless, completely enclosed within the body chamber 24 is an efficiently operating audio device, herein generally designated 26, demonstrating features of the present invention. The audio device 26 includes all of the necessary operating parts of a sound-reproducing system in a compact arrangement permitting the installation thereof internally of the doll body 22. Furthermore, and as will be described in more detail herein, the audio device 26 operates efficiently to playback a variety of messages to realistically simulate talking of the doll 20 and thereby increase the play value of said doll.

Figures 2, 5, 6:
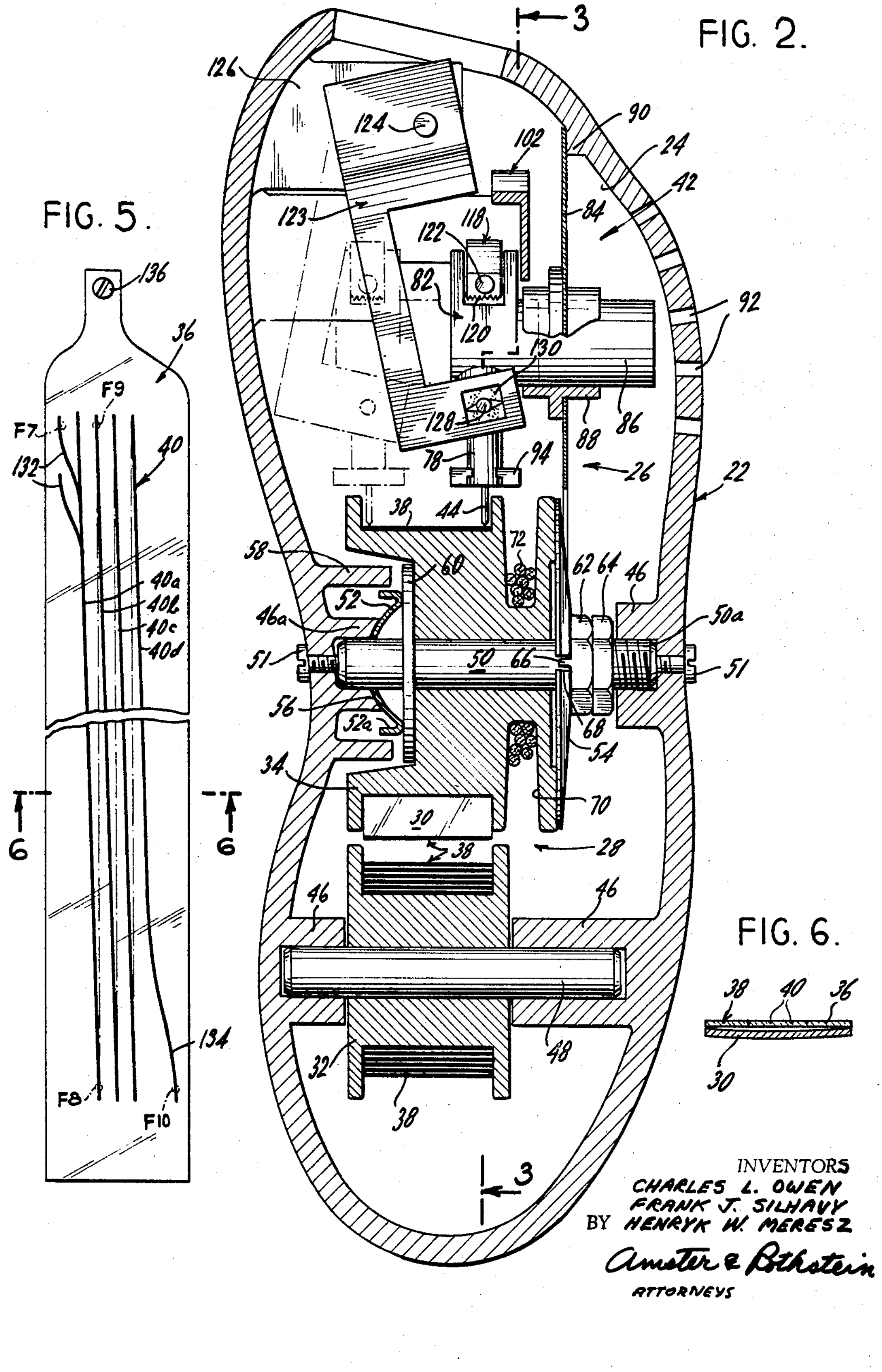
FIG. 2 is a side elevational view of said doll body and audio device, in section, taken on line 2—2 of FIG. 1, best illustrating details of construction of the constant-moving assembly of carrier spring and recording tape of said audio device which, for simplicity sake, is illustrated as a single line.
FIG. 5 is a plan view of the assembly of the recording tape and carrier spring of said audio device.
FIG. 6 is a sectional view taken on line 6—6 of FIG. 5 of said assembly of carrier spring and recording tape.
Figure 3:
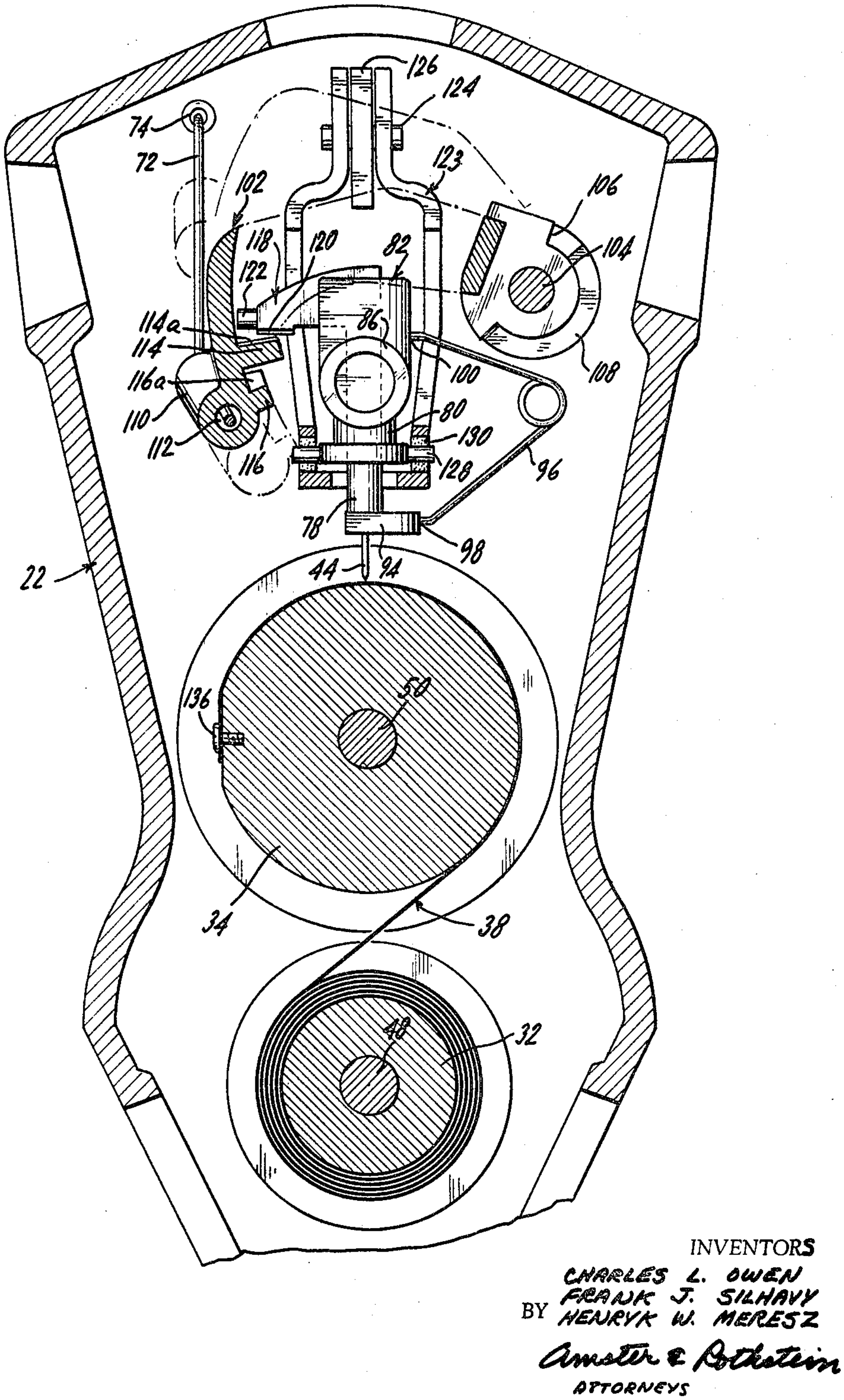
FIG. 3 is a front elevational view, in section, taken on line 3—3 of FIG. 2, illustrating further details of construction of said assembly carrier spring and tape and also of the stylus of said audio device.
Figure 4:
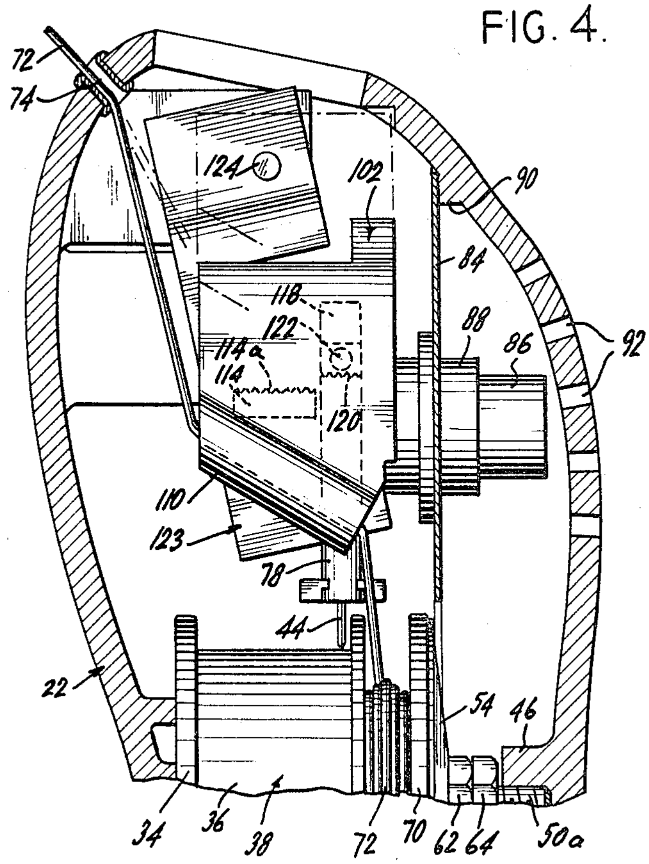
FIG. 4 is a partial side elevational view of said audio device illustrating further structural details of the stylus thereof.

Having particular reference now to FIGS. 2–4 in conjunction with FIG. 1, it will be seen that a major component of the miniature and internally mounted audio device 26 is a spring motor 28. The spring motor 28 is not utilized in a conventional manner to power any movable parts in rotation, but is herein classified as a motor since it includes the major structural parts of such a device. Thus, the motor 28 includes a pair of rotatably mounted drums 32 and 34 respectively serving as the storage drum and as the winding drum for a spring 30 connected in an appropriate manner at opposite ends to said drums. As is generally understood in the operation of a spring motor 28, the spring 30 is normally coiled about the rotatably mounted storage drum 32 and in practice is transferred in a coiled condition to the winding drum 34 when the winding drum is powered in rotation. Following this transfer, and also as is generally understood in the operation of a spring motor as exemplified by the motor 28, the spring 30 coiled about the winding drum 34 is under an urgency to uncoil therefrom and return back to its original coiled position about the storage drum 32. Thus, an essential functioning of the spring motor 28 is movement of the spring 30 from a coiled condition about the winding drum 34 back to an at-rest coiled position about the storage drum 32.

Brief reference is now made to FIGS. 5, 6, in which there is shown an assembly 38 of a recording tape 36 and the motor spring 30 serving as a carrier for said recording tape 36. That is, the tape 36 and spring 30 are appropriately united for movement in unison. The assembly 38 of recording tape 36 and spring 30 is thus used to advantage to contribute to the compact nature of the audio device 26 since, although requiring a minimum of space, it is effective to provide movement to the recording tape 36 for tracking engagement of multiple recording grooves 40 on the recording tape.

Referring again to FIGS. 2–4, it will be seen that another major component of the audio device 26 is the sound-reproducing or audio assembly thereof located in the upper section of the body chamber 24 and herein generally designated 42. The audio assembly 42 includes a stylus 44 having a sound-reproducing position adjacent the winding drum wherein the stylus 44 is in the path of movement of the tape and spring assembly 38. In this manner, once tracking engagement of the stylus 44 is established in a recording groove 40, the recorded material or message of such recording groove is reproduced by the audio assembly 42 during movement of the recording tape 36 past the stylus 44 by the automatic uncoiling of the tape-carrier spring 30.

As best shown in FIG. 2, the doll body 22 is molded with facing pairs of cylindrical bosses, herein collectively designated 46, provided for convenience in rotatably mounting the storage and winding drums 32, 34. The storage drum 32 is mounted for rotation on a drum shaft 48 extended between the lower opposing pair of bosses 46 located in the bottom portion of the body enclosure 24. Mounted transversely of the body 22 immediately above the storage drum 132 is the winding drum 34. The winding drum 34 is mounted for rotation about a stationary axle 50 which is fixed against rotation by set screws 51 bearing against the opposite ends of the axle 50. In order to regulate the playback speed of movement of the tape and spring assembly to the storage drum 32, the winding drum 34 is appropriately braked in rotation between a self aligning thrust washer 52 and washer 60 located adjacent one end of the drum 34 and a spring washer 54 located adjacent the other end of the drum. The washer 52 is disposed about the axle 50, being seated at its medial section in an arcuate seat 56 provided in the boss more specifically designated **46*a*. The peripheral bent end 52*a* of this washer is suitably confined within an integral cylindrical wall 58 which limits radial expansion of the washer 52 and bears against the washer 60. In this manner, the drum 34 is firmly urged into frictional engagement against the opposing spring washer 54 which is fixed in position on the axle 50 by a pair of nuts 62, 64 threadably engaged on the threaded end 50*a* of the axle 50. To prevent rotation of the spring washer 54 with the winding drum 34, the nut 62 is provided with a projection 66 which extends into a radial slot 68 of the spring washer 54. The actual braking applied against the winding drum 34 occurs along a peripheral surface on a pulley 70 formed integral with said winding drum 34 and in contact with the peripheral surface of the spring washer 54, and along the contacting surfaces of the washer 60 and drum 34. It is contemplated that suitable braking friction will be established to limit rotation of the winding drum 34 to a speed well below that which could be theoretically provided by the urgency of the spring 30 during spring pay-out from the winding drum 34. Thus during spring pay-out from the winding drum 34, the speed of movement of the tape and spring assembly 38 is held at a constant speed under the control of the spring washer 54. As a consequence, tracking movement of the recording tape 36 past the stylus 44** is also at a constant speed which is a requirement for good sound reproduction.

In order to power the winding drum 34 in rotation and thus achieve transfer of the tape and spring asembly 38 from the storage drum 32 into a coiled condition about said winding drum 34, it is necessary only to pull on a pull string 72 appropriately connected at one end to the winding drum 34 and normally in a coiled condition on the pulley 70. The opposite free end of the pull string 72 is extended from the body enclosure 24 through the opening 74 for connection with a pull ring 76.

Turning now to the details of construction of the audio assembly 42 of the audio device 26, as already mentioned such assembly includes the stylus 44 extending from a cylindrical body 78 slidable in a cylindrical leg 80 of an L-shaped member 82. The member 82 is employed to transmit the vibration of the stylus 44 to a speaker 84 and has another leg 86 slidably disposed within a bushing 88 appropriately fixedly mounted in the body of the speaker 84. The speaker 84 in turn is appropriately connected, as by an adhesive or the like, along a peripheral surface to a ridge 90 molded internally of the body 22. Thus, the vibrational pattern produced in the stylus 44 during tracking thereof in a recording groove 40 of the recording tape 36 is effectively transmitted via the stylus body 78 to the vibration-transmitting member 82. This vibration pattern is then transmitted by the member 82 to the speaker 84 to produce an audible reproduction of the message recorded in the recording groove 40. Plural openings 92 are provided in the body 22 adjacent to the speaker 84 so that the reproduced sound is not muffled by the body 22. The body 22 serves as a resonator to somewhat reinforce the sound produced by the audio device 26.

During the operation of the audio device 26, the stylus 44 has a degree of movement along a path radial to the winding drum 34 and also along a path transversely of this drum. The radial path of movement of the stylus 44 provides this member with two operative positions, one of which is a clearance position removed from the winding drum 34 and the other of which is an operative sound-reproducing position adjacent this drum. The clearance position for the stylus 44 is necessary in order to permit unimpeded rotation of the winding drum 34 during the transfer of the tape and spring assembly 38 from the storage drum 32 into a coiled condition about the winding drum 34. The transverse movement of the stylus 44 along the body of the winding drum 34 permits tracking or lateral displacement of the stylus 44 across the entire width of the recording tape 36 enabling the sequential playback of the plural messages recorded in the plural recording grooves 40 of said recording tape 36.

Attention is now directed to FIGS. 1, 3 wherein it is best shown how the stylus 44 is mounted for articulating movement along said radial and transverse paths of movement. As already stated, the cylindrical stylus body 78 is slidably received in the leg 80 of the member 82 and thus can be actuated into movement in opposite directions along a path radial to the winding drum 34. A U-shaped member 94 is force fitted on the end of the stylus body 78 and is effective to limit the extent of retracting radial movement of the stylus 44 from the winding drum 34. This retracting movement is against the urgency of a spring 96 connected at one end, as at 98, to the stop member 94 and at its other end connected, as at 100, to a rearward extension of the lateral leg 80 of the member 82. Thus, the stylus 44 is normally biased under the urgency of the spring 96 into its operative sound-recording position adjacent the winding drum 34. To actuate the stylus from this sound-reproducing position into a clearance position removed from the drum 34 (see for example FIG. 7), there is provided a positioning lever, generally designated 102, pivotally mounted at one end to a molded projection or pin 104 of the body 22. Lever 102, at said pivoted end has stop surfaces 106 thereon cooperating with an arcuate integrally molded body wall 108 which, in an obvious manner, limits the extent of pivotal movement of the lever 102 about the pivot 104. The free end of the positioning lever 102 terminates in a cylindrical section 110 having a through bore 112 through which the free end of the pull string 72 is threaded when being made accessible to the exterior of the body 22 through the body opening 74. Moreover, the inclination of the through bore 112 through the cylindrical section is such that there is frictional engagement of the pull string 72 along at least the exit opening thereof in the threaded course of the pull string 72 out of the body 22. As a consequence, pulling manipulation of the pull string 72 is effective to cause pivoting movement of the positioning lever 102 about the pivot 104 which is effective to bring one or the other of laterally extending legs 114 and 116 thereon into a position of abutment against a laterally extending leg 118 provided rearwardly of the stylus body 78. More particularly, in a manner which will be described in more detail subsequently, depending upon the transverse position of the stylus 44 along the winding drum 34, said surface abutment is made either with the lateral leg 114 in which case it is established between a serrated surface **114*a* thereon and a serrated surface 120 of the leg 118, or it is made with the lateral leg 116, in which case contact is established along an inclined cam surface 116*a* on this leg and a cylindrical projection 122 of the stylus body leg 118. The effect of surface abutment being established either along the cam surface 116*a* or along the serrated surface 114*a* will be better understood in the subsequent discussion of FIGS. 7–10, it being suffice at this time that it be understood that in either case the pivotal movement of the positioning lever 102 into surface abutment against the laterally extending stylus leg 118 is effective to actuate the stylus 44 from its operative sound-recording position adjacent the winding drum 34 into its clearance position removed from said winding drum. Moreover, this movement in the stylus 44 is produced by pulling manipulation of the pull string 72 which powers the winding drum 34 in rotation to transfer the tape and spring assembly 38 from the storage drum 32 into a coiled condition about the winding drum 34**.

Turning now to the transverse path of movement of the stylus 44, as best seen in FIG. 3 the assembly of the stylus body 78 and member 82 is mounted for movement transversely of the winding drum 34 in a yoke 123 pivotally mounted at one end, as at 123, to an internal body wall 126. At its other end, the yoke 123 receives laterally extending projections 128 on the cylindrical leg 80 of the member 82 in elastomeric mounting pads 130 carried in each section or arm of the yoke 123. Thus, as best shown in FIG. 2, the vibration transmitting member 82 by virtue of having one leg 86 slidable in the speaker bushing 88 and another leg 80 pivotally connected, as at 128, to the pivotally mounted yoke 123 does not restrain or prevent transverse movement of the stylus 44 along the body of the winding drum 34 and thus across the width of the recording tape 36.

Attention is now directed more particularly to FIGS. 5, 6 and a preferred construction of a tape and spring assembly 38 demonstrating features of the present invention. Both the recording tape 36 and spring 30 are of generally elongated rectangular shape and are substantially coextensive in size. The recording tape 36 has plural recording grooves 40 appropriately provided therein, which in the illustrated embodiment totals four in number. A different audio message is recorded in each of the recording grooves 40. Associated with the first recording groove, more specifically designated **40*a* in FIG. 5, are lead-in grooves 132 which are effective to bring the stylus 44 into tracking engagement with the first recording groove 40*a*. Once this tracking engagement is established, provision is made for the playback, in sequence, of the four recorded messages of the illustrated embodiment of the recording tape 36. To this end, it is provided that the transverse position of the stylus 44, when carried by engagement in the groove 40*a* to its remote end, will then have a transverse position for engaging the next encountered recording groove 40*b*. Similarly, the end tracking position in the groove 40*b* provides the stylus 44 with the proper transverse position for tracking in the third encountered recording groove 40*c*. Finally, the end tracking position of the stylus 44 in the third recording groove 40*c* provides the necessary starting position required of the stylus 44 for proper tracking in the last encountered recording groove 40*d*. Associated with the last encountered recording groove 40*d* is a recycle groove 134 which carries the stylus 44 to a clearance position along the edge of the recording tape 36** shown in phantom perspective in FIG. 2.

It is provided in accordance with the present invention that the spring 30 effectively functions as a carrier for the recording tape 36 so that during return movement of the spring 30 from the winding drum 34 back to the storage drum 32, the recording tape 36 is carried past the stylus 44 for playback. To achieve this there is a connection between the tape 36 and the spring 30 so that these two members provide the unitary assembly 38 and move in unison with each other. This operative connection may take the form of a surface lamination of the tape 36 along the entire surface of the spring 30 or it may merely consist of an attachment between the tape 36 and spring 30 at their opposite ends as in the illustrated embodiment. More particularly, at the tape and spring ends adjacent the beginnings of the recording grooves 40, attachment may be made by a screw 136 passing through the tape 36 and spring 30 and also serving to connect these members to the winding drum 34, as best shown in FIG. 3. The opposite ends of the tape 36 and spring 30 are connected to the storage drum 32 in any appropriate manner to make the necessary connection of the tape and spring assembly 38 to the storage drum. The coiled condition of the tape and spring assembly 38 on either of the storage or winding drums 32, 34 is such that there is an interleaving of turns of the recording tape 36 with the coils of the spring 30. Moreover, the tape and spring assembly 38 is arranged so that in the coiled condition of this assembly on the winding drum 34, the tape is outermost so that tracking engagement can be made by the stylus 44 in the recording grooves 40, whereas in the coiled condition of this assembly on the storage drum 32 the spring 30 occupies the outermost position.

Attention is now directed particularly to FIGS. 7–10 and FIG. 3 for a description of a typical, sequential playback of the recorded messages in recording grooves 40*a*–40*d* of the elongated strip of recording tape 36. It will first be noted, however, that in the construction of the positioning lever 102 the previously referred to laterally extending leg 114, as clearly shown in said FIGS. 7–10, is located centrally of said positioning lever and extends across only the medial portion of the width of said positioning lever 102. The laterally extending leg 116 on said positioning lever 102 displaced rearwardly of the leg 114 extends across the entire width of the positioning lever 102 and thus occupies a position extending beyond the opposite sides of the leg 114. Thus, in what will be understood to be the starting sound-reproducing position for the stylus 44, namely that position depicted in FIG. 7 wherein the stylus 44 is adjacent to the pulley end of the winding drum 34, when the positioning lever 102 is pivoted about the pivot 104 into surface abutment with the stylus leg 118, the surfaces that abut with each other are those of the projection 122 and the cam surface 116*a* of the leg 116. This has the effect at this time of merely holding the stylus 44 in its starting sound-reproduction position along the winding drum 34, and moreover occurs upon pulling manipulation of the pull string 72 which produces said pivoting movement of the positioning lever 102. Pulling of the pull string 72 also simultaneously results in the unwinding of said pull string from the pulley 70 and thus in the powering in rotation of the winding drum 34 which transfers the tape and spring assembly 38 from the storage drum 32 onto said winding drum 34. When the pull string 72 is released, the stylus 44 under the urgency of the spring 96 is biased into contact with the recording tape 36 while said recording tape is actuated into movement past said stylus 44 during return movement of the spring 30 from the winding drum 34 back to the storage drum 32. Due to the location of the stylus 44 adjacent the pulley end of the winding drum 34 the stylus 44 tracks in one of the lead-in grooves 132 which is effective to move the stylus transversely relative to the recording tape 36 and into the first recording groove 40*a* on the tape. In FIG. 5 the starting sound-reproducing position of the stylus 44 is shown in phantom perspective and identified by the reference designation F7 and will be understood to correspond to the position of said stylus as depicted diagrammatically in FIG. 7. Subsequent positions of the stylus 44 are also shown in FIG. 5, being designated F8, F9 and F10, and each respectively denoting positions diagrammatically depicted in FIGS. 8–10. Thus, tracking engagement of the stylus 44 is established in the first recording groove 40*a* and return movement of the tape and spring assembly 38 back to the storage drum 32 is effective to result in playback of the recorded message of the groove 40*a* by the audio assembly 42. Following this, the stylus 44 is moved to the position depicted in FIG. 8 wherein it has been displaced transversely of the recording tape 36 to a point coinciding both with the end of the first recording groove 40*a* and the beginning of the second groove 40*b*. When the pull string 72 is appropriately manipulated to again transfer the tape and spring assembly 38 to the winding drum 34, the simultaneously occurring pivotal movement of the positioning lever 102 this time results in surface abutment of the positioning lever 102 and stylus leg 118 along the respective surfaces 114*a*, 120. These surfaces, it will be recalled, have cooperating serrations thereon which interfit with each other such that there can be no further transverse movement of the stylus 44 relative to the positioning lever 102 during engagement of said abutting surfaces with each other. This in turn results in the stylus 44 being returned to the exact position transversely of the winding drum 34 which it occupied prior to the transfer of the tape and spring assembly 38 to the winding drum 34. This return of the stylus 44 into a sound-producing position adjacent the winding drum 34 is, of course, made after the transfer of the tape and spring assembly 38 in a coiled position about said winding drum 34. Thus, upon the return of the stylus 44 into a sound-reproducing position, the next recording groove 40*b* is effectively presented to the stylus 44. This procedure is repeated until there is a playback, in sequence, of each of the four recorded messages of the recorded grooves 40*a–d*.

After playback of the last recording groove 40*d*, the stylus 44 tracks in the recycle groove 134 which carries the stylus to a position of displacement transversely of the drum 34 which produces abutment of the camming surface 116*a* and the stylus projection 122 when the positioning lever 102 is actuated through pivotal movement. This position of the stylus 44 is shown in FIG. 10, and as further illustrated in phantom perspective therein the pivotal movement of the lever 102 is effective to cam the stylus 44 from this position across the width of the winding drum 34 back to its starting sound-reproducing position.

A latitude of modification, change and substitution is intended in the foregoing disclosure and in some instances some features of the invention will be employed without a corresponding use of other features.

We claim:

1. An audio device for a doll having a hollow body and means for supporting said audio device internally thereof, a spring motor mounted within said hollow body for operating said audio device, said spring motor including a spring and a pair of rotatably mounted drums respectively serving as a storage drum and as a winding drum for said spring, said spring being connected at one end to said storage drum and normally coiled thereabout and connected at its opposite end to said winding drum such that rotation of said winding drum is effective to transfer said spring in a coiled condition to said winding drum preparatory to automatic movement of said spring back to said storage drum during pay-out of said coiled spring, and said audio device comprising sound-reproducing means including a stylus and means for supporting said stylus in a sound-reproducing position along the path of movement of said spring adjacent said winding drum, a recording tape having plural messages recorded thereon in individual recording grooves arranged substantially parallel to each other and lengthwise of said tape, each recording groove having a starting end and an ending end, the ending end of at least one of said grooves and the starting end of an adjacent groove being located such that they both are in the same transverse position relative to said winding drum, said recording tape being arranged lengthwise of said spring and connected at least at its opposite ends thereto for being actuated through movement in unison with said spring past said stylus for establishing tracking engagement of said stylus within a recording groove of said tape, and means for mounting said stylus in its supported sound-reproducing position for movement along a first path of movement radial to said winding drum for selectively positioning said stylus in a clearance position from said winding drum and in a tracking position against the recorded tape coiled about said winding drum and along a second path of movement transversely of said winding drum for successively tracking within said plural recording grooves thereon to provide sequential playback of said plural messages recorded on said tape, a positioning lever pivotally mounted for movement into surface abutment against said stylus for actuating said stylus into said clearance position, said surfaces on said lever and on said stylus coming into said surface abutment having cooperating serrations thereon for holding the transverse position of said stylus relative to the winding drum during movement of the stylus into and out of said clearance position, and a pull string normally coiled about said winding drum and effective when uncoiled therefrom in pulling manipulation to power said winding drum in rotation for transferring said spring from said storage drum to said winding drum, said pull string being threaded through said positioning lever wherein pulling manipulation is effective to actuate said positioning lever into abutment against said stylus for movement thereof into said clearance position to permit unimpeded spring and tape transfer onto said winding drum.

2. An audio device for a doll as defined in claim 1 wherein said surfaces on said lever and on said stylus coming into said surface abutment also have cooperating camming surfaces thereon for camming said stylus from an ending position along said second path of movement into a starting position along said second path of movement for repeating the sequential playback of said plural recorded messages.

3. An audio device comprising a spring motor including a spring and a pair of drums respectively serving as a storage drum and a winding drum for said spring, said spring being normally coiled about said storage drum and connected at one end to said winding drum such that rotation of said winding drum is effective to transfer said spring in a coiled condition to said winding drum preparatory to automatic movement of said spring back to said storage drum during pay-out of said coiled spring, a tape having plural messages recorded thereon in individual grooves arranged substantially parallel to each other and each extending lengthwise of said tape, means for moving said tape responsive to movement of said spring, sound-reproducing means including a stylus and means for supporting said stylus in a sound-reproducing position along the path of movement of said tape for establishing tracking engagement of said stylus within a groove of said tape, manually operable means for rotating said winding drum to transfer said spring from said storage drum to said winding drum, and means responsive to the operation of said manually operable means for separating said stylus and said tape, said grooves controlling said stylus to move transversely of said tape for engagement with different ones of said plural grooves during successive operations of the audio device, the starting end of each groove being at a different transverse position on the tape from the portion of the groove at which said stylus and tape are separated.

References Cited

UNITED STATES PATENTS

| | | | |
|---|---|---|---|
| 3,245,688 | 4/1966 | Ryan | 274—1.1 |
| 2,212,623 | 8/1940 | Stravss | 274—1.1 |
| 2,238,412 | 4/1941 | Daniel | 274—11 |
| 2,292,856 | 8/1942 | Woolf et al. | 274—11 |
| 2,622,700 | 12/1952 | Geyer | 185—37 |
| 3,162,980 | 12/1964 | Hellman | 274—1.1 |
| 3,165,320 | 1/1965 | Ryan | 274—1.1 XR |
| 3,285,609 | 11/1966 | Hiller | 274—1.1 |
| 3,285,612 | 11/1966 | Hallamore | 274—11.12 |

LEONARD FORMAN, *Primary Examiner.*

SAMUEL S. MATTHEWS, *Examiner.*

LLOYD V. ANDERSON, *Assistant Examiner.*